(12) United States Patent
Sung et al.

(10) Patent No.: US 9,182,523 B2
(45) Date of Patent: Nov. 10, 2015

(54) OPTICAL FILM AND MANUFACTURING METHOD THEREOF, LIQUID CRISTAL DISPLAY APPARATUS USING THE OPTICAL FILM

(75) Inventors: Gi Suk Sung, Seongnam-si (KR); Chang Kun Kim, Yongin-si (KR)

(73) Assignee: GLOTEC CO., LTD, Jincheon-Gun (KR)

( * ) Notice: Subject to any disclaimer, the term of this patent is extended or adjusted under 35 U.S.C. 154(b) by 365 days.

(21) Appl. No.: 13/525,881

(22) Filed: Jun. 18, 2012

(65) Prior Publication Data
US 2013/0010234 A1 Jan. 10, 2013

(30) Foreign Application Priority Data
Jul. 6, 2011 (KR) .................. 10-2011-0066649

(51) Int. Cl.
*G02B 5/04* (2006.01)
*G02B 5/02* (2006.01)
*F21V 8/00* (2006.01)

(52) U.S. Cl.
CPC ............ *G02B 5/0231* (2013.01); *G02B 5/0278* (2013.01); *G02B 6/0053* (2013.01)

(58) Field of Classification Search
CPC ... G02B 6/0053; G02B 6/0051; G02B 6/0056
USPC ..................... 359/831, 599; 349/64
See application file for complete search history.

(56) References Cited

U.S. PATENT DOCUMENTS

2010/0328579 A1* 12/2010 Shim et al. .................. 349/64

* cited by examiner

*Primary Examiner* — Euncha Cherry
(74) *Attorney, Agent, or Firm* — LRK Patent Law Firm

(57) ABSTRACT

An optical sheet having a single sheet structure for an edge-lighting backlight unit using a printless light guide plate, a method of manufacturing the same, and a liquid crystal display apparatus using the same are provided. The optical sheet having a single sheet structure includes a first prism sheet having a prism pattern formed on the upper surface thereof, and a second prism sheet having a prism pattern formed on the upper surface thereof. Further, prism ridges of the first prism sheet are attached to the bottom surface of the second prism sheet by means of an adhesive so that the prism pattern of the first prism sheet and the prism pattern of the second prism sheet are directed in the same direction.

46 Claims, 4 Drawing Sheets

OPTICAL FILM AND MANUFACTURING METHOD THEREOF, LIQUID CRISTAL DISPLAY APPARATUS USING THE OPTICAL FILM

BACKGROUND OF THE INVENTION

1. Field

The present invention relates to an optical sheet for a backlight unit (BLU) of a liquid crystal display apparatus and a method of manufacturing the same, and a liquid crystal display apparatus using the optical sheet. More particularly the present invention relates to an optical sheet having a single sheet structure for an edge-lighting backlight unit using a printless light guide plate in a liquid crystal display apparatus, and to a method of manufacturing the same, and to a liquid crystal display, apparatus using the optical sheet.

2. Description of the Related Art

The light guide plates that can be used in the edge-lighting backlight units of LCDs usually fall into the two categories of a prism light guide plate, which uses only light refraction, and a non-printing light guide plate, which uses the scattering and condensation of light. FIG. 1 schematically illustrates a backlight unit using the prism light guide plate. As illustrated in FIG. 1, the backlight unit comprises a prism light guide plate 11 having a prism pattern 10 formed on the bottom surface thereof, and a reverse prism sheet 13 disposed on the prism light guide plate 11 and having a prism pattern 12 formed on the bottom surface thereof. Although a single sheet on the prism light guide plate may be achieved using the prism light guide plate illustrated in FIG. 1, the viewing angle is too narrow and it is difficult to manufacture the prism light guide plate, and it is not used more but rather less. FIG. 2 schematically illustrates a backlight unit using the printless light guide plate. As illustrated in FIG. 1, this unit comprises a printless light guide plate 20, a diffusion sheet 21 bonded to the upper surface of the printless light guide plate 20, a prism sheet 22 bonded to the upper surface of the diffusion sheet 21 and having a prism pattern 23 formed on the upper surface of the prism sheet, and a protective sheet 24 bonded to the upper surface of the prism sheet 22. Also, the backlight unit using the printless light guide plate may be configured without the protective sheet 24. In the case of the printless light guide plate using the scattering and condensation of light, which is easier to manufacture than the prism light guide plate, there is provided an optical sheet comprising a combination of two or three sheets of a diffusion sheet/a prism sheet or a diffusion sheet/a prism sheet/a protective sheet as illustrated in FIG. 2. FIG. 3 illustrates the direction of travel of light caused by the backlight unit using two sheets, an upper and a lower prism sheet. As illustrated in FIG. 3, the diffusion sheet 31 functions to screen the pattern of the light guide plate 30 which scatters light and also enables the obliquely directed light emitted from the light guide plate 30 to travel to some extent in the perpendicular direction. The prism sheet 32 functions' to condense the light, which has traveled to some extent in the perpendicular direction by means of the diffusion sheet 31, so that the light is sent in the perpendicular direction. As illustrated in FIG. 3, the backlight unit for notebook PCs condenses light in the completely perpendicular direction using two sheets comprising the lower vertical prism sheet 32 and the upper horizontal prism sheet 33. However, the backlight unit for LCD-TVs uses a single horizontal prism sheet because the use of two prism sheets may increase luminance but decrease the viewing angle from both sides. The prism sheet is problematic because prism-shaped ridges are exposed to the surface and may thus easily generate scratches upon handling or after assembly. To solve this problem or improve the viewing angle, a protective sheet may be disposed on the prism sheet.

However, the case where the printless light guide plate is adopted in the backlight unit for LCD-TVs is problematic because a plurality of optical sheets is used, undesirably making it impossible to achieve slimness, decreasing assembly productivity and increasing the cost of the backlight unit.

Thus there is required a single sheet for a backlight unit using the printless light guide plate in LCD-TVs in order to achieve slimness, increase assembly productivity and reduce the manufacturing cost.

SUMMARY

Accordingly, the present invention has been made keeping in mind the above problems occurring in the related art, and an object of the present invention is to provide an optical sheet, which may be provided in the form of a single sheet for a backlight unit using a printless light guide plate in LCD-TVs, thus achieving slimness, increasing assembly productivity and reducing the manufacturing cost, and also to provide a method of manufacturing the optical sheet, and a liquid crystal display apparatus using the optical sheet.

In order to accomplish the above object, a first aspect of the present invention provides an optical sheet having a single sheet structure, comprising a first base layer comprising a first polyethyleneterephthalate (PET) film; a first functional layer having a prism pattern formed in a first direction on the upper surface of the first base layer; a second base layer comprising a second PET film; an adhesive layer for adhering the prism pattern of the first functional layer to the bottom surface of the second base layer; and a second functional layer having a prism pattern formed in the first direction on the upper surface of the second base layer.

Also, a second aspect of the present invention provides an optical sheet having a single sheet structure, comprising a first base layer comprising a first PET film; a first functional layer having a prism pattern formed in a first M direction on an upper surface of the first base layer; a second base layer comprising a second PET film; an adhesive layer for adhering the prism pattern of the first functional layer to a bottom surface of the second base layer; a second functional layer having a prism pattern formed in the first direction on an upper surface of the second base layer; a third base layer comprising a third PET film; a second adhesive layer for adhering the prism pattern of the second functional layer to a bottom surface of the third base layer; and a third functional layer having a micro-lens pattern or a diffusion pattern on an upper surface of the third base layer.

Also, a third aspect of the present invention provides a liquid crystal display apparatus in which the optical sheet having a single sheet structure according to the first and second aspects of the present invention may be applied to a backlight unit.

Also, a fourth aspect of the present invention provides a method of manufacturing an optical sheet having a single sheet structure, comprising applying a UV resin on an upper surface of a first PET film to form a prism pattern in a first direction and performing curing using UV light, thus forming a lower prism sheet; thinly applying a UV resin on a lower surface of a second PET film, thus forming an adhesive layer; performing curing using UV light while bringing ridges of the prism pattern of the prism sheet into close contact with the adhesive layer, thus forming a flat panel prism sheet; and applying a UV resin on the upper surface of the flat panel prism sheet to form a prism pattern in the first direction and performing curing using UV light, thus forming an upper prism sheet.

Also a fifth aspect of the present invention provides a method of manufacturing an optical sheet having a single sheet structure, comprising applying a UV resin on an upper surface of a first PET film to form a prism pattern in a first direction and performing curing using UV light, thus forming a lower prism sheet; thinly applying a UV resin on a lower surface of a second PET film, thus forming a first adhesive layer; performing curing using UV light while bringing ridges of the prism pattern of the prism sheet into close contact with the first adhesive layer, thus forming a first flat panel prism sheet; applying a UV resin on an upper surface of the first flat panel prism sheet to form a prism pattern in the first direction and performing curing using UV light, thus forming an upper prism sheet; thinly applying a UV resin on a lower surface of a third PET film, thus forming a second adhesive layer; performing curing using UV light while bringing ridges of the prism pattern of the upper prism sheet into close contact with the second adhesive layer, thus forming a second flat panel prism sheet; and forming a micro-lens pattern or a diffusion pattern using a UV resin on an upper surface of the second flat panel prism sheet and curing it using UV light, thus forming a lens sheet.

DETAILED DESCRIPTION

Hereinafter, embodiments of the present invention will be more clearly understood with reference to the appended drawings.

Figure 1:
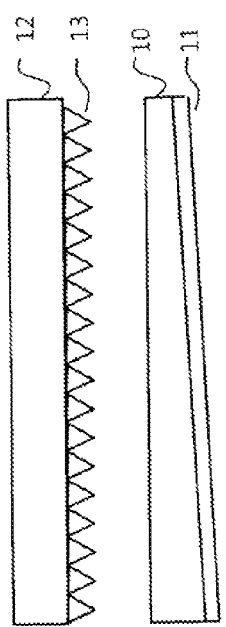
FIG. 1 is a schematic view illustrating a conventional backlight unit using a prism light guide plate.
Figure 2:
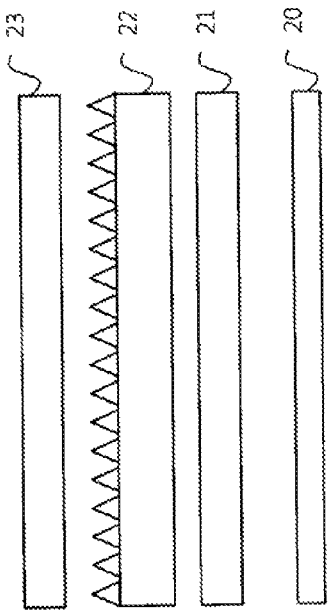
FIG. 2 is a schematic view illustrating a conventional backlight unit using a printless light guide plate.
Figure 3:
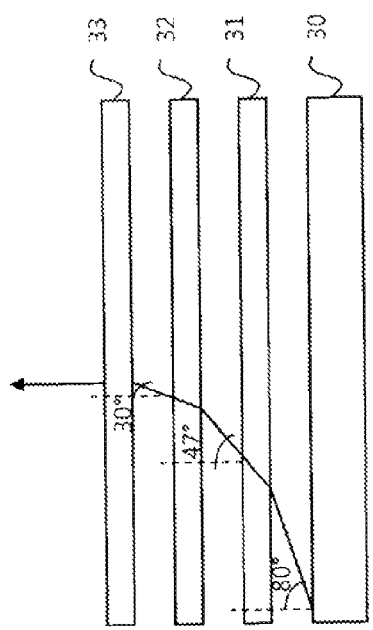
FIG. 3 is a schematic view illustrating the direction of travel of light caused by the backlight unit.
Figure 4:
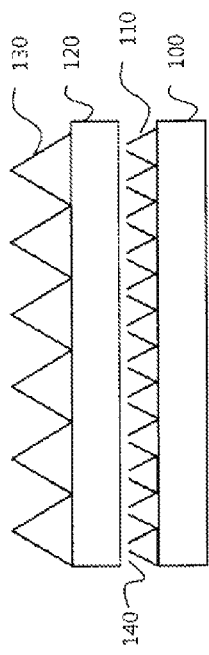
FIG. 4 is a schematic view illustrating an optical sheet having a single sheet structure for a backlight unit, according to an embodiment of the present invention.

FIG. 4 is a schematic view illustrating an optical sheet having a single sheet structure for a backlight unit according to an embodiment of the present invention. As illustrated in FIG. 4, the optical sheet having a single sheet structure according to the present invention comprises a first base layer 100 comprising, as a polyethylene terephthalate (PET) film, a first PET film; a first functional layer 110 having a prism pattern formed in a first direction on the upper surface of the first base layer 100; a second base layer 120 comprising a second PET film; an adhesive layer 140 which adheres the prism pattern of the first functional layer 110 to the bottom of the second base layer 120; and a second functional layer 130 having a prism pattern formed in the first direction on the upper surface of the second base layer 120.

The optical sheet having a single sheet structure according to the present invention may further comprise a back coating layer formed on the bottom surface of the first base layer 100.

The optical film having a single sheet structure according to the embodiment of the present invention is configured such that the lower prism pattern having small pitches of 20~50 μm is formed in the first direction on the upper surface of the first base layer 100 comprising the first PET film, which is thin to the level of 30~60 μm, to form the first functional layer 110, and simultaneously, a UV resin is applied thinly on the lower surface of the second PET film, which is thin to the level of 30~60 μm, to form the adhesive layer 140, and while the ridges of the prism pattern of the first functional layer 110 are being brought into contact with the adhesive layer 140, they are cured using UV light thus manufacturing the second base layer 120 having a flat panel prism sheet shape. The upper prism pattern having pitches of 51~100 μm is formed in the same direction as that of the first functional layer 110 on the upper surface of the second base layer 120 having a flat panel prism sheet shape, to form the second functional layer 130. Preferably, the first base layer 100 comprises a PET film having a thickness of 50 μm, and also preferable is for the first functional layer 110 to have a prism pattern comprising prism ridges, which have a height of 10~20 μm and a pitch of 20~50 μm, on the upper surface of the first base layer 100. The second base layer 120 comprises a PET film having a thickness of 50 μm, and provided on the upper surface of the second base layer 120 is the second functional layer 130 having a prism pattern comprising prism ridges which have a height of 21~40 μm and a pitch of 51~100 μm. These layers are attached to form a single sheet structure having a total thickness of 140~180 μm.

The reason why the height and the pitch of the ridges of the prism pattern of the first functional layer 110 are formed to be less than those of the second functional layer 130 is that when the ridges of the prism pattern of the first functional layer 110 and the bottom surface of the second base layer 120 are adhered to each other by means of the adhesive layer 140, the pitch of the prism ridges is formed to be smaller, making it easy to control the adhesive force. Also, the reason why the pitch of the prism pattern of the first functional layer 110 is set to be different from that of the second functional layer 130 is to decrease the total thickness of the single sheet and to prevent the Moire phenomenon due to the interference of light.

As mentioned above, the optical film having a single sheet structure according to the present invention is provided in the form of a single sheet by laminating the first prism sheet comprising the first base layer 100 and the first functional layer 110 with the PET film. Because the prism sheet cannot be attached onto the diffusion sheet, attached onto the first prism sheet having the prism pattern formed in the first direction is the second prism sheet which includes the second base layer 120 and the second functional layer 130 and has the prism pattern formed in the same direction as has the first prism sheet. The first prism sheet which is located at the lower position enables the obliquely directed light emitted from the light guide plate to travel to some extent in the perpendicular direction as in the diffusion sheet, and the second prism sheet functions to condense the light so that such light travels in a direction more proximate to the perpendicular direction. Furthermore, the first prism sheet and the second prism sheet may be attached in such a manner that the peaks of the prism ridges of the first prism sheet are embedded in the adhesive.

Figure 5:
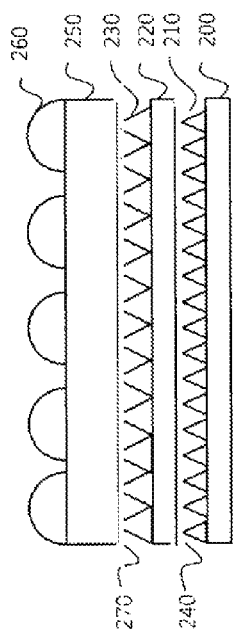
FIG. 5 is a schematic view illustrating an optical sheet having a single sheet structure for a backlight unit, according to another embodiment of the present invention.

FIG. 5 schematically illustrates an optical sheet having a single sheet structure for a backlight unit according to another embodiment of the present invention. As illustrated in FIG. 5, the optical sheet having a single sheet structure according to the present invention comprises a first base layer 200 comprising a first PET film; a first functional layer 210 having a prism pattern formed in a first direction on the upper surface of the first base layer 200; a second base layer 220 comprising a second PET film; a first adhesive layer 240 for adhering the prism pattern of the first functional layer 210 to the bottom surface of the second base layer 220; a second functional layer 230 having a prism pattern formed in the first direction on the upper surface of the second base layer 220; a third base layer 250 comprising a third PET film; a second adhesive layer 270 for adhering the prism pattern of the second functional layer 230 to the bottom surface of the third base layer 250; and a third functional layer 260 having a micro-lens pattern or a diffusion pattern on the upper surface of the third base layer 250.

The optical sheet having a single sheet structure according to the present invention may further comprise a back coating layer on the bottom surface of the first base layer 200. Also, the optical film having a single sheet structure according to the present invention is configured such that the first prism sheet including the first base layer 200 and the first functional layer 210 and having the prism pattern formed, in the first direction is attached to the second prism sheet including the second base layer 220 and the second functional layer 230 and having the prism pattern formed in the same direction as that of the first prism sheet so that the second prism sheet is disposed on the first prism sheet, and the ridges of the prism pattern of the second functional layer 230 are adhered to the bottom surface of the third base layer 250 of the lens sheet having the micro-lens pattern thereon or the diffusion sheet having the diffusion pattern thereon by means of the adhesive layer so that they are attached together. The first prism sheet and the second prism sheet, and the second prism sheet and the lens sheet or the diffusion sheet may be attached in such a manner that the peaks of the prism ridges of the prism sheet are embedded in the adhesive.

FIG. 5 illustrates the optical sheet having a single sheet structure formed by laminating the lens sheet on the second prism sheet when using the protective sheet in the embodiment of FIG. 4. In this case, the thickness of the lens sheet or the diffusion sheet may be 160~170 μm.

Figure 6:
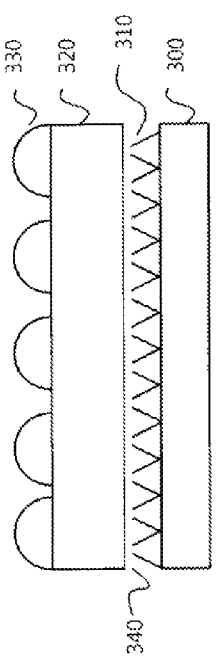
FIG. 6 is a schematic view illustrating a conventional composite optical sheet.

The lens sheet has a light condensing function corresponding to about 80% of the prism sheet, as well as a diffusion function as does the diffusion sheet. FIG. 6 schematically illustrates a typical composite optical sheet. As illustrated in FIG. 6, the composite optical sheet is obtained by laminating a lens sheet on a prism sheet. Table 1 below shows the results of measuring the properties of optical sheets in a 32" 2H LED backlight unit. The composite optical sheet of FIG. 6 has low luminance which is insufficient for substituting for the lens sheet/prism sheet/protective sheet as seen in Table 1, and has a single sheet structure which may merely substitute for two lens sheets but is not truly regarded as a single sheet. The reason why the conventional composite optical sheet has low luminance is that although the lower prism sheet enables the obliquely directed light to travel to some extent upwards as in the diffusion sheet, the ability of the upper lens sheet to condense light is lower than that of the prism sheet.

TABLE 1

|  | Protective Sheet Prism Sheet Lens Sheet | Lens Sheet Lens Sheet | Composite Sheet | Single Sheet |
|---|---|---|---|---|
| Luminance (cd/m²) | 2,213 | 1,907 | 1,946 | 2,050 |
| x | 0.2521 | 0.2520 | 0.2508 | 0.2535 |
| y | 0.2273 | 0.2251 | 0.2245 | 0.2277 |
| Luminance (Relative Ratio) | 116.0% | 100.0% | 102.0% | 107.5% |
| Thickness | 850 μm | 600 μm | 260 μm | 300 μm |

In the present invention in order to decrease the thickness of the optical sheet having a single sheet structure, lamination is carried out using thin PET films, thereby solving problems of heat deformation and sheet wrinkle that occur in optical sheets using thick PET films due to the composite structure. Also, in the present invention, to solve difficulties upon lamination using thin PET films, the pitch of the prism pattern is formed to be smaller thus facilitating control of the adhesive force.

The optical sheet having a single sheet structure according to the above embodiment may be applied to a backlight unit of a liquid crystal display apparatus.

Figure 7:
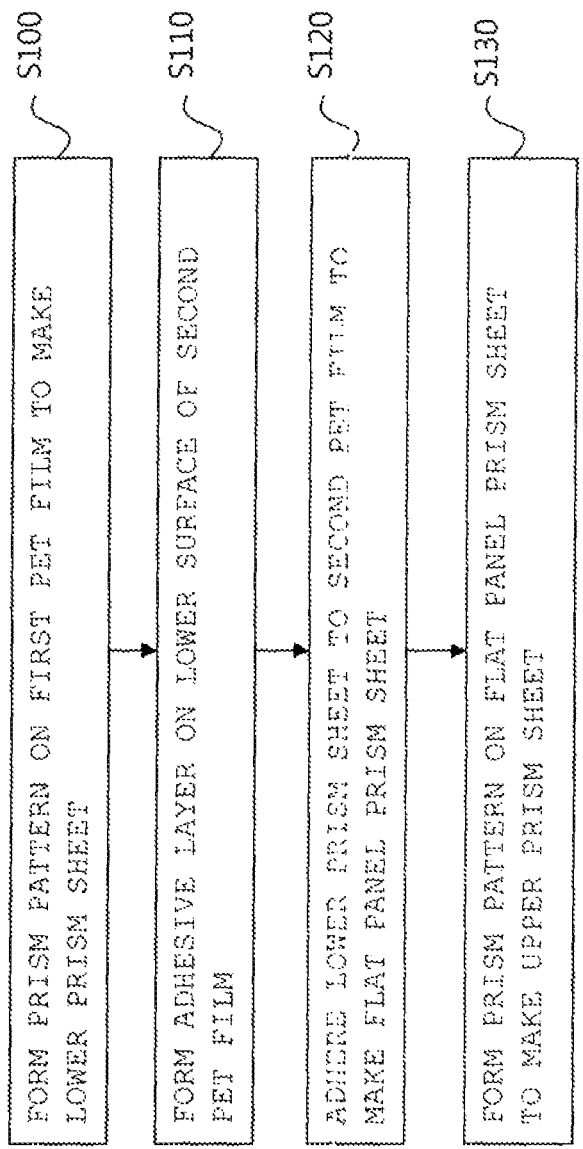
FIG. 7 is a flowchart illustrating a process of manufacturing the optical sheet having a single sheet structure for a backlight unit according to an embodiment of the present invention.

FIG. 7 is a flowchart illustrating a process of manufacturing the optical sheet having a single sheet structure for a backlight unit according to an embodiment of the present invention. As illustrated in FIG. 7, the method of manufacturing the optical sheet having a single sheet structure comprises applying a UV resin on the upper surface of a first PET film to form a prism pattern in a first direction and performing curing using UV light thus making a lower prism sheet (S100), thinly applying a UV resin on the lower surface of a second PET film thus forming an adhesive layer (S110); performing curing using UV light while bringing the ridges of the prism pattern of the lower prism sheet into close contact with the adhesive layer, thus making a flat panel prism sheet (S120); applying a UV resin on the upper surface of the flat panel prism sheet to form a prism pattern in the first direction and performing curing using UV light, thus making an upper prism sheet (S130).

Figure 8:
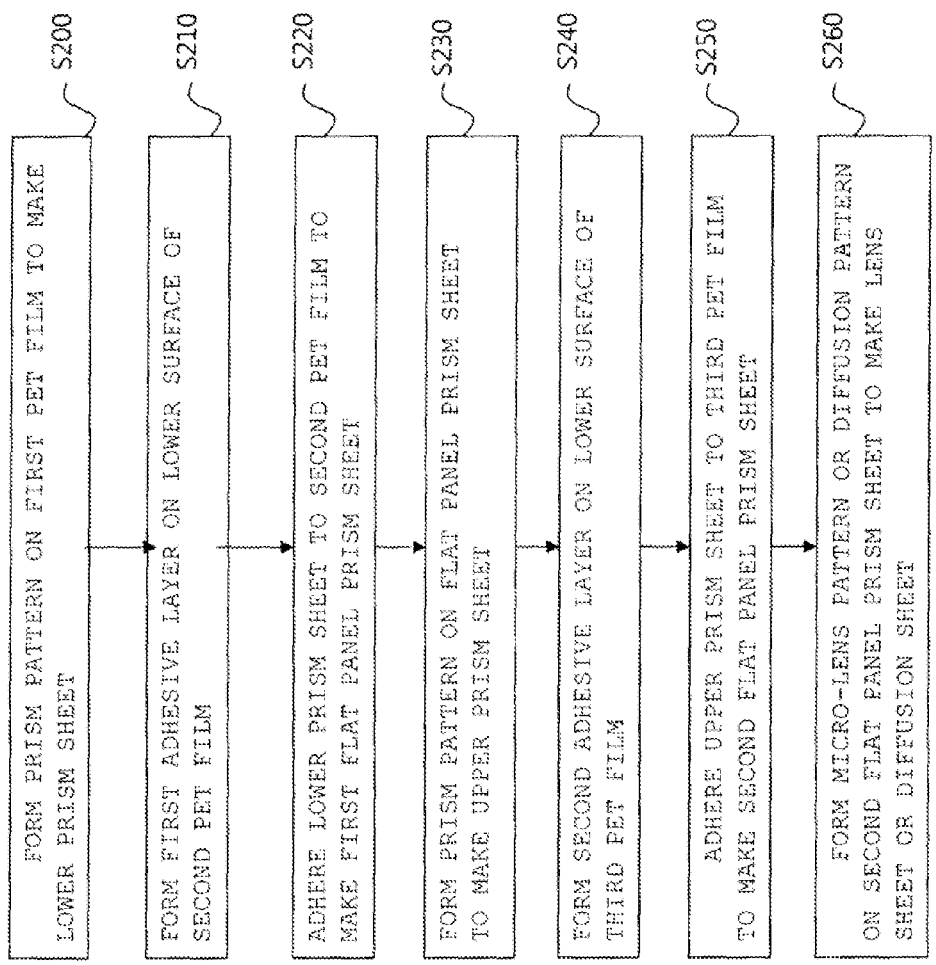
FIG. 8 is a flowchart illustrating a process of manufacturing the optical sheet having a single sheet structure for a backlight unit according to another embodiment of the present invention.

FIG. 8 is a flowchart illustrating a process of manufacturing the optical sheet having a single sheet structure for a backlight unit according to another embodiment of the present invention. As illustrated in FIG. 8, the method of manufacturing the optical sheet having a single sheet structure comprises applying a UV resin on the upper surface of a first PET film to form a prism pattern in a first direction and performing curing using UV light, thus making a lower prism sheet (S200); thinly applying a UV resin on the lower surface of a second PET film, thus forming a first adhesive layer (S210); performing curing using UV light while bringing the ridges of the prism pattern of the lower prism sheet into close contact with the first adhesive layer, thus forming a first flat panel prism sheet (S220); applying a UV resin on the upper surface of the first flat panel prism sheet to form a prism pattern in the first direction and performing curing using UV light, thus forming an upper prism sheet (S230); thinly applying a UV resin on the lower surface of a third PET film, thus forming a second adhesive layer (S240); performing curing using UV light while bringing the ridges of the prism pattern of the upper prism sheet into close contact with the second adhesive layer, thus forming a second flat panel prism sheet (S250); and forming a micro-lens pattern or a diffusion pattern using a UV resin on the upper surface of the second flat panel prism sheet and curing it using UV light, thus making a lens sheet (S260).

As apparent from the above description, an optical sheet can be provided in the form of a single sheet for a backlight unit using a printless light guide plate in LCD-TVs, thus achieving slimness, increasing assembly productivity, and reducing the manufacturing cost.

The embodiments as described above correspond to some of the variety of embodiments which are incorporated into the spirit of the present invention. The scope of the present invention also incorporates a variety of embodiments for forming an optical sheet having a single sheet structure by laminating the lower prism sheet with the upper prism sheet having the prism pattern formed in the same direction as has the lower prism sheet.

What is claimed is:

1. An optical sheet having a single sheet structure, comprising:
    a first prism sheet having a prism rib whose height is 10-20 μm and a prism pattern whose pitch is 20-50 μm on an upper surface thereof to locate the optical sheet directly on a printless light-guide plate of an LCD-TV (liquid crystal display television); and
    a second prism sheet deposited on the first prism sheet, and having a prism rib whose height is 21-40 μm and a prism pattern whose pitch is 51-100 μm on an upper surface thereof,
    wherein the prism rib of the first prism sheet is attached to a bottom surface of the second prism sheet by means of an adhesive so that the prism pattern of the first prism sheet and the prism pattern of the second prism sheet are directed in the same direction.

2. An optical sheet having a single sheet structure, comprising:
    a first prism sheet having a prism rib whose height is 10-20 μm and a prism pattern whose pitch is 20-50 μm on an upper surface thereof to locate the optical sheet directly on a printless light-guide plate of an LCD-TV (liquid crystal display television);
    a second prism sheet deposited on the first prism sheet, and having a prism rib whose height is 21-40 μm and a prism pattern whose pitch is 51-100 μm on an upper surface thereof; and
    a lens sheet deposited on the second prism sheet, and having a micro-lens pattern formed on an upper surface thereof,
    wherein the prism rib of the first prism sheet is attached to a bottom surface of the second prism sheet by means of an adhesive so that the prism pattern of the first prism sheet and the prism pattern of the second prism sheet are directed in the same direction,
    wherein the prism rib of the second prism sheet is attached to a bottom surface of the lens sheet by means of an adhesive, and
    wherein a thickness of the lens sheet is larger than that of the first prism sheet or the second prism sheet.

3. An optical sheet having a single sheet structure, comprising:
    a first prism sheet having a prism rib whose height is 10-20 μm and a prism pattern whose pitch is 20-50 μm on an upper surface thereof to locate the optical sheet directly on a printless light-guide plate of an LCD-TV (liquid crystal display television);
    a second prism sheet deposited on the second prism sheet, and having a prism rib whose height is 21-40 μm and a prism pattern whose pitch is 51-100 μm on an upper surface thereof; and
    a diffusion sheet having a diffusion pattern on an upper surface thereof,
    wherein the prism rib of the first prism sheet is attached to a bottom surface of the second prism sheet by means of an adhesive so that the prism pattern of the first prism sheet and the prism pattern of the second prism sheet are directed in the same direction,
    wherein the prism rib of the second prism sheet is attached to a bottom surface of the diffusion sheet by means of an adhesive, and
    wherein a thickness of the diffusion sheet is smaller than that of the first prism sheet or the second prism sheet.

4. The optical sheet of claim 1, wherein the first prism sheet and the second prism sheet each comprise a polyethyleneterephthalate (PET) film, and a prism pattern layer formed on an upper surface of the PET film.

5. The optical sheet of claim 2, wherein the first prism sheet and the second prism sheet each comprise a polyethyleneterephthalate (PET) film, and a prism pattern layer formed on an upper surface of the PET film.

6. The optical sheet of claim 3, wherein the first prism sheet and the second prism sheet each comprise a polyethyleneterephthalate (PET) film, and a prism pattern layer formed on an upper surface of the PET film.

7. The optical sheet of claim 4, wherein the prism pattern layer is formed using a UV resin.

8. The optical sheet of claim 5, wherein the prism pattern layer is formed using a UV resin.

9. The optical sheet of claim 6, wherein the prism pattern layer is formed using a UV resin.

10. The optical sheet of claim 1, wherein the first prism sheet and the second prism sheet are attached in such a manner that peaks of the prism rib of the first prism sheet are embedded in the adhesive.

11. The optical sheet of claim 2, wherein the first prism sheet and the second prism sheet are attached in such a manner that peaks of the prism rib of the first prism sheet are embedded in the adhesive.

12. The optical sheet of claim 3, wherein the first prism sheet and the second prism sheet are attached in such a manner that peaks of the prism rib of the first prism sheet are embedded in the adhesive.

13. The optical sheet of claim 1, wherein the adhesive is composed of a UV resin.

14. The optical sheet of claim 2, wherein the adhesive is composed of a UV resin.

15. The optical sheet of claim 3, wherein the adhesive is composed of a UV resin.

16. The optical sheet of claim 1, wherein a surface of the first prism sheet opposite the surface having the prism pattern is back coated.

17. The optical sheet of claim 2, wherein a surface of the first prism sheet opposite the surface having the prism pattern is back coated.

18. The optical sheet of claim 3, wherein a surface of the first prism sheet opposite the surface having the prism pattern is back coated.

19. The optical sheet of claim 1, wherein a height of the rib of the prism pattern of the first prism sheet is different from a height of the rib of the prism pattern of the second prism sheet.

20. The optical sheet of claim 2, wherein a height of the rib of the prism pattern of the first prism sheet is different from a height of the rib of the prism pattern of the second prism sheet.

21. The optical sheet of claim 3, wherein a height of the rib of the prism pattern of the first prism sheet is different from a height of the rib of the prism pattern of the second prism sheet.

22. The optical sheet of claim 19, wherein the height of the rib of the prism pattern of the first prism sheet is less than the height of the rib of the prism pattern of the second prism sheet.

23. The optical sheet of claim 20, wherein the height of the rib of the prism pattern of the first prism sheet is less than the height of the rib of the prism pattern of the second prism sheet.

24. The optical sheet of claim 21, wherein the height of the rib of the prism pattern of the first prism sheet is less than the height of the rib of the prism pattern of the second prism sheet.

25. The optical sheet of claim 19, wherein the height of the rib of the prism pattern of the first prism sheet is 10-20 μm, and the height of the rib of the prism pattern of the second prism sheet is 21-40 μm.

26. The optical sheet of claim 20, wherein the height of the rib of the prism pattern of the first prism sheet is 10-20 μm, and the height of the rib of the prism pattern of the second prism sheet is 21-40 μm.

27. The optical sheet of claim 21, wherein the height of the rib of the prism pattern of the first prism sheet is 10-20 μm, and the height of the rib of the prism pattern of the second prism sheet is 21-40 μm.

28. The optical sheet of claim 1, wherein a pitch of the prism pattern of the first prism sheet is different from a pitch of the prism pattern of the second prism sheet.

29. The optical sheet of claim 2, wherein a pitch of the prism pattern of the first prism sheet is different from a pitch of the prism pattern of the second prism sheet.

30. The optical sheet of claim 3, wherein a pitch of the prism pattern of the first prism sheet is different from a pitch of the prism pattern of the second prism sheet.

31. The optical sheet of claim 28, wherein the pitch of the prism pattern of the first prism sheet is less than the pitch of the prism pattern of the second prism sheet.

32. The optical sheet of claim 29, wherein the pitch of the prism pattern of the first prism sheet is less than the pitch of the prism pattern of the second prism sheet.

33. The optical sheet of claim 30, wherein the pitch of the prism pattern of the first prism sheet is less than the pitch of the prism pattern of the second prism sheet.

34. The optical sheet of claim 28, wherein the pitch, of the prism pattern of the first prism sheet is 20-50 μm, and the pitch of the prism pattern of the second prism sheet is 51-100 μm.

35. The optical sheet of claim 29, wherein the pitch of the prism pattern of the first prism sheet is 20-50 μm, and the pitch of the prism pattern of the second prism sheet is 51-100 μm.

36. The optical sheet of claim 30, wherein the pitch of the prism pattern of the first prism sheet is 20-50 μm, and the pitch of the prism pattern of the second prism sheet is 51-100 μm.

37. An optical sheet having a single sheet structure, comprising:
a first base layer comprising a first PET film configured to locate the optical sheet directly on a printless light-guide plate of an LCD-TV (liquid crystal display television);
a first functional layer formed with a prism rib whose height is 10-20 μm and a prism pattern whose pitch is 20-50 on an upper surface of the first base layer;
a second base layer comprising a second PET film configured to be deposited on the first function layer;
an adhesive layer for adhering the prism pattern of the first functional layer to a bottom surface of the second base layer; and
a second functional layer formed with a prism rib whose height is 21-40 μm and a prism pattern whose pitch is 51-100 μm on an upper surface of the second base layer.

38. An optical sheet having a single sheet structure, comprising:
a first base layer comprising a first PET film configured to locate the optical sheet directly on a printless light-guide plate of an LCD-TV (liquid crystal display television);
a first functional layer formed with a prism rib whose height is 10-20 μm and a prism pattern whose pitch is 20-50 μm on an upper surface of the first base layer;
a second base layer comprising a second PET film confirmed to be deposited on the first function layer;
a first adhesive layer for adhering the prism pattern of the first functional layer to a bottom surface of the second base layer;
a second functional layer formed with a prism rib whose height is 21-40 μm and a prism pattern whose pitch is 51-100 μm on an upper surface of the second base layer;
a third base layer comprising a third PET film configured to be deposited on the second function layer;
a second adhesive layer for adhering the prism pattern of the second functional layer to a bottom surface of the third base layer; and
a third functional layer having a micro-lens pattern or a diffusion pattern on an upper surface of the third base layer.

39. A liquid crystal display apparatus comprising the optical sheet having a single sheet structure of claim 1.

40. A liquid crystal display apparatus comprising the optical sheet having a single sheet structure of claim 2.

41. A liquid crystal display apparatus comprising the optical sheet having a single sheet structure of claim 3.

42. A liquid crystal display apparatus comprising the optical sheet having a single sheet structure of claim 37.

43. A liquid crystal display apparatus comprising the optical sheet having a single sheet structure of claim 38.

44. A method of manufacturing an optical sheet having a single sheet structure, comprising:
applying a UV resin on an upper surface of a first PET film to form a prism pattern in a first direction and performing curing using UV light, thus forming a lower prism sheet having a prism rib whose height is 10-20 μm and a prism pattern whose pitch is 20-50 μm;
thinly applying a UV resin on a lower surface of a second PET film, thus forming an adhesive layer;
performing curing using UV light while bringing rib of the prism pattern of the lower prism sheet into close contact with the adhesive layer, thus forming a flat panel prism sheet; and
applying a UV resin on an upper surface of the flat panel prism sheet to form a prism pattern in the first direction and performing curing using UV light, thus forming an upper prism sheet having a prism rib whose height is 21-40 μm and a prism pattern whose pitch is 51-100 μm.

45. A method of manufacturing an optical sheet having a single sheet structure, comprising:
applying a UV resin on an upper surface of a first PET film to form a prism pattern in a first direction and performing curing using UV light, thus forming a lower prism sheet having a prism rib whose height is 10-20 μm and a prism pattern whose pitch is 20-50 μm;
thinly applying a UV resin on a lower surface of a second PET film, thus forming a first adhesive layer;
performing curing using UV light while bringing rib of the prism pattern of the lower prism sheet into close contact with the first adhesive layer, thus forming a first flat panel prism sheet;
applying a UV resin on an upper surface of the first flat panel prism sheet to form a prism pattern in the first direction and performing curing using UV light, thus forming an upper prism sheet having a prism rib whose height is 21-40 μm and a prism pattern whose pitch is 51-100 μm;

thinly applying a UV resin on a lower surface of a third PET film, thus forming a second adhesive layer;

performing curing using UV light while bringing rib of the prism pattern of the upper prism sheet into close contact with the second adhesive layer, thus forming a second flat panel prism sheet; and forming a micro-lens pattern using a UV resin on an upper surface of the second flat panel prism sheet and curing it using UV light, thus forming a lens sheet.

46. A method of manufacturing an optical sheet having a single sheet structure, comprising:

applying a UV resin on an upper surface of a first PET film to form a prism pattern in a first direction and performing curing using UV light, thus forming a lower prism sheet having a prism rib whose height is 10-20 µm and prism pattern whose pitch is 20-50 µm;

thinly applying a UV resin on a lower surface of a second PET film, thus forming a first adhesive layer;

performing curing using UV light while bringing rib of the prism pattern of the lower prism sheet into close contact with the first adhesive layer, thus forming a first flat panel prism sheet;

applying a UV resin on an upper surface of the first flat panel prism sheet to form a prism pattern in the first direction and performing curing using UV light, thus forming an upper prism sheet having a prism rib whose height is 21-40 µm and a prism pattern whose pitch is 51-100 µm;

thinly applying a UV resin on a lower surface of a third PET film, thus forming a second adhesive layer;

performing curing using UV light while bringing rib of the prism pattern of the upper prism sheet into close contact with the second adhesive layer, thus forming a second flat panel prism sheet; and forming a diffusion pattern using a UV resin on an upper surface of the second flat panel prism sheet and curing it using UV light, thus forming a diffusion sheet.

* * * * *